United States Patent Office 2,698,841
Patented Jan. 4, 1955

2,698,841

REACTION PRODUCT OF AN OLEFIN-DIOLEFIN RESIN WITH A CYCLODIOLEFIN

John F. McKay, Jr., Cranford, N. J., assignor to Standard Oil Development Company, a corporation of Delaware No Drawing. Application June 26, 1952,
Serial No. 295,836

6 Claims. (Cl. 260—45.5)

This invention relates to a method for improving the properties of hydrocarbon resins and more particularly relates to a method of improving the softening properties of olefin-diolefin resins.

It is known that hydrocarbon resins can be produced from olefins and diolefins by a variety of methods such as polymerization, using Friedel-Crafts type catalysts. The resins produced, however, have softening points that are generally too low for certain applications. For use as the binding ingredient in floor tile, for example, it is desirable that hydrocarbon resins have softening point of about 102–105° C. or greater so that the floor tiles made therefrom have good hardness-indentation properties. Most of the resins that are produced from such hydrocarbon streams by Friedel-Crafts polymerization have softening points lower than 100° C. Heretofore all attempts to raise the softening points of these resins have seriously degraded the color of the resins. This is undesirable, since light colored resins are premium materials. It has now been discovered that 20–120% of cyclopentadiene or its dimer, methylcyclopentadiene or its dimer, or other cyclodiolefins or any of their mixtures have a surprisingly beneficial effect on the softening point of hydrocarbon resins without seriously causing loss of color. By the process of this invention, the usually low softening points of hydrocarbon resins are raised so that the resins become suitable for use in floor tile and other compositions where high softening point is required.

Hydrocarbon resins to which the present invention is applicable are made by treating a hydrocarbon mixture containing 10 to 35% diolefins and 30 to 65% olefins and 0 to 60% of aromatics, paraffins, and naphthenes with 0.25–2.5% of a Friedel-Crafts type catalyst such as aluminum chloride, aluminum bromide, boron trifluoride, and the like or solutions, slurries, or complexes thereof. The reactions are conducted at temperatures in the range of −100 to +100° C. (preferably −35 to +65° C.). Residual catalyst is quenched by suitable methods, such as addition of methyl alcohol and subsequent filtration, water and/or caustic washing and the final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils. These streams have boiling ranges between 20° and 280° C., or may be composed of any intermediate fractions thereof. A typical stream shows 20% diolefins, 51% olefins, 27% aromatics, and 2% paraffins and naphthenes.

According to the preferred method of carrying out the present invention, the hydrocarbon resin, prepared as described above, is placed in a bomb together with 20–120% (preferably 50 to 120%) of the cyclodiolefin and the bomb is flushed with nitrogen. The bomb is placed in a shaker which provides gentle agitation. The temperature is maintained at 240–280° C. until the desired increase in softening point is attained. The reaction products are then transferred to a stirred reactor and stripped of any unreacted components of the feed. A reaction time of 3 to 6 hours is required.

It is important that the temperature be maintained above about 240° C., since at lower temperatures no copolymerization takes place. However, care should be taken that the temperature does not exceed the decomposition point of the resin.

Although nitrogen is indicated above to be a suitable blanketing agent, other gases such as $CO_2$ and gaseous hydrocarbons are entirely suitable. The presence of air is permissible, although some increase in the color of the resin product will occur.

The cyclodiolefin components of the feed may represent pure cyclopentadiene or its dimer or pure methylcyclopentadiene or its dimer or mixed codimers and dimers of these. The actual amount of cyclodiolefins added is important. The cycodiolefin may be added as concentrates of 20 to 100%, preferably 40–100%. It may be diluted with hydrocarbons such as benzene, toluene, or other aromatics, if desired. The following represent analyses of typical concentrates which may be used:

|  | A | B | C | D | E | F |
|---|---|---|---|---|---|---|
| Wt. Percent Cyclopentadiene | 74 | 38 | 25 |  | 30 | 97 |
| Wt. Percent Methylcyclopentadiene | 13 | 33 | 55 | 80 | 5 | 3 |
| Hydrocarbons boiling in range of 90–250° C., Wt. Percent | 13 | 29 | 20 |  | 5 |  |
| Toluene, Wt. Percent |  |  |  | 20 | 60 |  |

Ordinarily the cyclodiolefins are recovered as dimers and codimers. Streams which have been heated to convert monomers to dimers and low boiling components (i. e., boiling below 130°–160° C.) are concentrated by distillation. Thus the dimers will be diluted with some hydrocarbons boiling in and around the range of the dimers and codimers. On the other hand, these dimer concentrates can be cracked and fractionated to separate the individual cyclopentadienes.

The concentration of cyclodiolefins may be 20–120% based on the resin. If it is desired that increased softening point be obtained without loss in resin color, 50–120% based on the resin should be used and the amount of cyclopentadiene should be at least four times that of the methylcyclopentadiene.

In order to obtain the best quality resins, it is important that there be no increase in the color of the resins since, for many purposes, substantially colorless resins are eminently desirable. However, a moderate increase in color can be tolerated for some uses, for example, in the darker colored floor tiles. For very light colored tile, it is desirable that the color not be increased over that of the starting resin. Softening point, however, is the most important criteria for determining the usefulness of the resin.

The following examples will serve to illustrate the mode of operation as well as the advantages of the present invention, though it will be understood that various other embodiments or modifications not specifically illustrated herein are possible without departing from the spirit or scope of the invention.

EXAMPLE 1

Various hydrocarbon streams containing olefins, diolefins, aromatics, and saturated hydrocarbons obtained by steam cracking of gas oils were polymerized in the presence of a Friedel-Crafts type catalyst at various temperatures. The resins were recovered by stripping off the unreacted hydrocarbons by vacuum distillation. Analysis in each case indicated that the resin was of a non-aromatic structure, since little or none of the aromatic constituents of the feed entered the composition. The data are summarized in the following table:

Table I

| Run No. | 1 | 2 | 3 | 4 | 5 | 6 | 7 | 8 | 9 |
|---|---|---|---|---|---|---|---|---|---|
| Approx. Boiling Pt. (° C.) | 20-48 | 20-125 | 20-125 | 38-130 | 48-130 | 48-130 | 30-280 | 85-260 | 85-260 |
| Composition, Wt. Percent (Approx.): | | | | | | | | | |
| Diolefins | 30 | 20 | 20 | 19.4 | 12 | 12 | 15 | 15 | 15 |
| Olefins | 60 | 48 | 48 | 50.6 | 50.9 | 50.9 | 62 | 45 | 45 |
| Aromatics— | | | | | | | | | |
| Benzene | | 25 | 25 | 22 | 28.5 | 28.5 | 4.5 | | |
| Toluene | | 6 | 6 | 7 | 7.6 | 7.6 | 10.1 | 10 | 10 |
| Higher | | | | | | | 7.2 | 15 | 15 |
| Paraffins, Naphthenes | 10 | 1 | 1 | 1 | 1 | 1 | 1.2 | 15 | 15 |
| Polymerization: | | | | | | | | | |
| Catalyst | $AlCl_3$ | $AlCl_3$ | $AlCl_3$ | $AlCl_3$ | $AlCl_3$ | $BF_3$ | $AlCl_3$ | $AlCl_3$ | $BF_3$ |
| Temperature (° C.) | 15 | 25 | 100 | 45 | 45 | 25 | 25 | 20 | 50 |
| Resin, Wt. Percent [1] | 65-85 | 25-35 | 19 | 30-36 | 18-23 | 15 | 20-30 | 16 | 11 |
| S. Pt.[1] (° C.) | 70-85 | 70-90 | 66 | 85-95 | 80-95 | 74 | 85-100 | 96 | 76 |

[1] The exact softening point and yield depend upon the degree of work-up of the resin, such as stripping conditions, etc.

EXAMPLE 2

A series of resins obtained in accordance with run number 2 of Example 1 was reacted with dicyclopentadiene in a stainless steel 1 liter bomb and heated. The bomb was supported in a horizontal shaking device to provide gentle agitation. After several hours on temperature, the bomb was cooled and its contents were transferred to a stirred flask. The temperature was maintained at 160° C. for 5 hours. The results are shown in the following table:

ing point in 9 hours reaction time at 280° C., but the color is darkened somewhat. (Run 7.)

6. Methyl cyclopentadiene dimer is not as effective as dicyclopentadiene for raising resin softening point and color is degraded. (Runs 8, 9, and 10.)

7. The presence of air darkens the color of the product. (Run 12.)

EXAMPLE 3

The resin obtained in accordance with run 1 in Table

Table II
POST SYNTHESIS POLYMERIZATION OF HYDROCARBON RESINS [1]

| Run No. | Percent by Wt. of Additive Based on Resin | Temp.,[2] ° C. | Time, hrs. | Original Resin | | Modified Resin | | Yield, Percent [5] |
|---|---|---|---|---|---|---|---|---|
| | | | | Soft. Pt., °C.[3] | Color [4] | Soft. Pt., °C. | Color | |
| 1 | 100 Di CPD [6] | 280 | 3 | 72 | 5 | 106 | 4 | 103.0 |
| 2 | 50 Di CPD | 280 | 3 | 75 | 2 | 92 | 4 | 99 |
| 3 | 10 Di CPD | 280 | 3 | 72 | 5 | 79 | 6 | |
| 4 | 50 Di CPD | 280 | 1 | 72 | 5 | 75 | 8 | 96.3 |
| 5 | 50 Di CPD | 280 | 6 | 70 | 3 | 106 | 3 | 101 |
| 6 | 100 Di CPD | 200 | 3 | 72 | 5 | Less than 40 | 3 | 82 |
| 7 | 20 Di CPD | 280 | 9 | 83 | 2 | 98 | 5 | 100.5 |
| 8 | 96 Di MCPD [7] | 280 | 3 | 72 | 5 | 83 | 16 | 100 |
| 9 | 100 Mixed Dimer Concentrate [8] | 280 | 3 | 75 | 2 | 95 | 11 | 107.5 |
| 10 | 120 Bottoms from Cracked Dimer Concentrate.[9] | 280 | 3 | 75 | 2 | 98 | 9 | |
| 11 | 100 Di CPD as 40% Solu. in Toluene. | 280 | 6 | 84 | 4 | 105 | 8 | 99.5 |
| 12 | 100 Di CPD plus AIR | 280 | 3 | 81 | 2 | 101 | 5 | 98 |

[1] Prepared by $AlCl_3$ polymerization of unsaturated naphthas from the distillation of refinery streams. Resins stripped to 280° C. @ 3 mm. Hg.
[2] Run in bomb with shaking under self pressure. Reaction products then treated 5 hours @ 160° C. at atmospheric pressure to decompose unreacted additive and to distill off impurities.
[3] Ring and ball method.
[4] 1 g. resin dissolved in 67 ml. xylene and color read on Gardner scale in Gardner colorimeter. Lower numbers are lighter colored.
[5] Based on original resin plus additive in charge to bomb.
[6] Dicyclopentadiene concentrate. Plant sample containing CPD and MCPD in about a 5/1 ratio with minimum specification of 87% purity. However, purity may be as high as 90% or more, thus accounting for over 100% yields.
[7] Laboratory sample of methyl cyclopentadiene dimer in toluene solution. Contained 80% dimer as used.
[8] A refinery stream having the following analysis: CPD, 38.5%; MCPD, 33.7%; other cyclodienes, 6.8%; acylic dienes, 7.3%; impurities, 13.7%.
[9] Concentrate used in run 9 from which some of the CPD was removed by cracking and fractionation. Analysis: CPD, 23%; MCPD, 53%; impurities, 24%.

From the data in Table II the following conclusions are drawn:

1. Hydrocarbon resins copolymerize with 50–100% dicyclopentadiene in 3 to 6 hours at 280° C. under self pressure to yield resins of greatly improved softening point and good color. Yields are essentially 100%. (Runs 1, 2 and 5.)
2. 10% dicyclopentadiene gives only a small increase in softening point (run 3) in 3 hours at 280° C. and the color is degraded.
3. 1 hour reaction time at 280° C. is too short (run 4).
4. Reaction does not occur at 200° C. (run 6).
5. 20% dicyclopentadiene gives an increase in soften- II was used to make a floor tile with the following formulation:

| Parts | Material |
|---|---|
| 36 | Asbestos (Johns-Manville 7R). |
| 36 | Calcium Carbonate. |
| 3 | Titanium Dioxide. |
| 15 | Modified Resin. |
| 6 | Plasticizer (Zeco 3270, a pitch type plasticizer mfd. by G. S. Ziegler Co.). |

The stock worked well on the hot mixing mill and was molded into ⅛" thick floor tile. The tile was light gray in color. The following evaluations show that the experimental floor tile passes federal specifications on indentation, flexure, and curl resistance.

|  | McBurney Indentation, Mils | | | Flexure | | | Inches Curl |
|---|---|---|---|---|---|---|---|
|  | 77° F., 1 min. | 77° F., 10 mins. | 115° F., 30 Secs. | Lbs. Load | Inches Deflection at Break | | |
| Experimental Floor Tile. | 7 | 10 | 27 | Pass | 0.6 | | 0.00. |
| Federal Specifications for Floor Tile (⅛" thick tile). | 7 min | 11 max | 38 max | 3 min | 0.4 min | | 0.03 max. |

The nature of the present invention having been thus fully set forth and specific examples of the same given, what is claimed as new and useful and desired to be secured by Letters Patent is:

1. A process for raising the softening point of a substantially non-aromatic unsaturated hydrocarbon resin obtained by treating a steam cracked petroleum distillate boiling in the range of about 20° to 280° C. in the presence of 0.25 to 2.5% Friedel-Crafts type catalyst at a temperature of −100° C. to +100° C., which comprises heating to a temperature of about 240° C.–280° C., the said resin and at least 20% up to about 120% of a hydrocarbon selected from the class consisting of cyclopentadiene, dicyclopentadiene, methylcyclopentadiene, the dimer of methylcyclopentadiene, and mixtures of these.

2. A process for raising the softening point of a substantially non-aromatic unsaturated hydrocarbon resin without darkening the color of the resin, said resin being obtained by treating a steam cracked petroleum distillate boiling in the range of about 20° to 280° C. in the presence of 0.25 to 2.5% Friedel-Crafts type catalyst at a temperature of −100° to +100° C., which comprises heating to a temperature of about 240° C.–280° C., the said resin and at least 50% up to about 100% of dicyclopentadiene.

3. A process for raising the softening point of a substantially non-aromatic unsaturated hydrocarbon resin obtained by treating a steam cracked petroleum distillate boiling in the range of about 20° to 280° C. in the presence of 0.25 to 2.5% Friedel-Crafts type catalyst at a temperature of −100° to +100° C., which comprises heating to a temperature of about 240° C.–280° C., the said resin and at least 50% up to about 100% of the dimer of methyl cyclopentadiene.

4. A process for raising the softening point of a substantially non-aromatic unsaturated hydrocarbon resin obtained by treating a steam cracked petroleum distillate boiling in the range of about 20° to 280° C. in the presence of 0.25 to 2.5% Friedel-Crafts type catalyst at a temperature of −100° to +100° C., which comprises heating to a temperature of about 240° C.–280° C., the said resin and at least 50% up to about 100% of a mixture of at least four parts of cyclopentadiene for each part of methylcyclopentadiene.

5. A process for raising the softening point of a substantially non-aromatic unsaturated hydrocarbon resin obtained by treating a hydrocarbon mixture of 10–35% diolefins, 30–65% olefins and 0 to 60% of aromatics, paraffins and naphthenes in the presence of 0.25 to 2.5% Friedel-Crafts type catalyst at a temperature of −100° to +100° C., which comprises heating to a temperature of about 240° C.–280° C., the said resin and at least 20% up to about 120% of a hydrocarbon selected from the class consisting of cyclopentadiene, dicyclopentadiene, methylcyclopentadiene, the dimer of methylcyclopentadiene, and mixtures of these.

6. A high softening point resin consisting essentially of a 240°–280° C. heat-reaction product of about 100 parts by weight of a non-aromatic unsaturated hydrocarbon resin which is an olefin-diolefin polymerization product obtained by treating a steam cracked petroleum distillate boiling in the range of about 20 to 280° C. in the presence of 0.25 to 2.5% Friedel-Crafts catalyst at a temperature of −100° C. to +100° C. reacted with about 50 to 100 parts by weight of dicyclopentadiene, said resin reaction product having a substantially higher heat softening point than that of said olefin-diolefin resin prior to reaction with the dicyclopentadiene.

References Cited in the file of this patent

UNITED STATES PATENTS 2,468,414     Soday     April 26, 1949